(12) United States Patent
Walker (10) Patent No.: US 12,380,654 B1
(45) Date of Patent: Aug. 5, 2025

(54) CULTURE 3D VIRTUAL MUSEUM SYSTEM

(71) Applicant: Lawrence E. Walker, Pompano Beach, FL (US)

(72) Inventor: Lawrence E. Walker, Pompano Beach, FL (US)

( * ) Notice: Subject to any disclaimer, the term of this patent is extended or adjusted under 35 U.S.C. 154(b) by 73 days.

(21) Appl. No.: 18/117,380

(22) Filed: Mar. 3, 2023

Related U.S. Application Data (60) Provisional application No. 63/316,533, filed on Mar. 4, 2022.

(51) Int. Cl.
*G06T 19/00* (2011.01)

(52) U.S. Cl.
CPC .................. *G06T 19/003* (2013.01)

(58) Field of Classification Search
CPC .................................................. G06T 19/003
See application file for complete search history.

(56) References Cited

U.S. PATENT DOCUMENTS

| | | | | |
|---|---|---|---|---|
| 2005/0066358 A1* | 3/2005 | Anderson | ................ | H04N 7/16 348/E7.054 |
| 2007/0260708 A1* | 11/2007 | Beaton | ............... | H04N 21/4532 709/219 |
| 2009/0144143 A1* | 6/2009 | Iyer | ........................ | G06Q 30/02 707/E17.108 |
| 2013/0275869 A1* | 10/2013 | Haswell | .................. | G06Q 50/00 715/706 |
| 2016/0171185 A1* | 6/2016 | Daniel | ............... | G06Q 30/0643 705/27.2 |
| 2018/0350144 A1* | 12/2018 | Rathod | ............... | G06Q 20/3224 |
| 2019/0108682 A1* | 4/2019 | Spivack | ............. | G06Q 30/0277 |
| 2024/0112410 A1* | 4/2024 | Mao | ......................... | G06T 5/70 |

FOREIGN PATENT DOCUMENTS

| | | | | | |
|---|---|---|---|---|---|
| JP | | 2004133864 A | * | 4/2004 | ............. G06F 17/60 |
| WO | WO2019225192 A1 | * | 11/2019 | ........... G10K 11/178 |

OTHER PUBLICATIONS

Khan et al.; "An IoT-Enabled Information System for Smart Navigation"; Dec. 31, 2021; Sensors; MDPI (Year: 2021).*
Sacher et al.; "Towards a versatile metadata exchange format for digital museum collections"; 2013; IEEE Xplore, p. 129-136 (Year: 2013).*

* cited by examiner

*Primary Examiner* — Ryan R Yang (57) ABSTRACT

A history and cultural 3D virtual museum that has a user-friendly software based interactive platform that is accessible worldwide on-line via the Internet or comparable remote access network systems and includes a variety of images of an outside image of the museum and walks the visitor from outdoors through the entrance into the museum, includes a plurality of floors and sections which display a myriad of objects, pictures and artifacts along with audio and visual descriptions of the items much like an actual "in-person" museum, provides guided tours, monitors on every floor with search engines, touch tone screen and museum library and includes an interactive children's section, theatre room, book store, research section, library, book store and green space.

7 Claims, 9 Drawing Sheets

CULTURE 3D VIRTUAL MUSEUM SYSTEM

CROSS-REFERENCE TO RELATED APPLICATION

This application claims the benefit of U.S. provisional patent application Ser. No. 63/316,533 filed Mar. 4, 2020.

STATEMENT REGARDING FEDERALLY SPONSORED RESEARCH OR DEVELOPMENT

N/A

FIELD OF THE INVENTION

The present invention relates to a virtual museum, and in particular, to a culture three-dimensional (3D) virtual museum that is accessible on-line via the Internet or comparable remote access network system for worldwide public access which includes multiple levels and sections with a plurality of artifacts, displays and activities and accessed, navigated, and operated by user-friendly interactive software so as to create the experience of visiting a museum in person. A preferred version of the invention is directed to African American history and culture.

BACKGROUND OF THE INVENTION

There are a variety of museums available in the United States for visiting in person. However, not everyone can visit these museums. There are also websites that show periods of history, but they do not give the look and feel of visiting an actual museum. However, there are no known virtual 3D museums available online or other computer networks. In fact, there are no museums that adequately cover or virtual 3D museums that display African American history. Accordingly, there exists a need for a 3D virtual museum and especially one that focuses on African American history.

There exists a variety of virtual experiences but none of them address the shortcomings in the prior art. For instance, U.S. Pat. No. 11,024,085 ("the '085 Patent") discloses a 3D mixed-reality space and experience construction sharing system is configured to provide a novel part-holographic and part-physical object-based immersive user experience environment that enables an intermixture of computer-generated lifelike holographic objects and real objects to be synchronized and correlated to a particular physical space (i.e. as a "mixed-reality" (MR) environment) for vividly-interactive user experiences during a users visit to the particular physical space. U.S. Pat. No. 10,873,709 ("the '709 Patent") discloses systems and methods for automatic detection and insetting of digital streams into a 360 video. U.S. Pat. No. 10,831,332 ("the '332 Patent") discloses methods of communicating, displaying, and storing information relating to structures, as well as apparatuses for executing such methods. U.S. Pat. No. 9,928,657 ("the '657 Patent") discloses a museum augmented reality platform that interacts between computer devices and a server via a communication network. The augmented reality platform includes a multimedia recognition application located on the computer device, which receives live, real-time content and converts it into coordinates, and a client application located on the computer devices that transmit raw data packets including the coordinates. U.S. Pat. No. 8,340,903 ("the '903 Patent") discloses a system to provide optimum guidance for an individual seeking the destination point in a complex building. U.S. Publication No. 2019/0073831 ("the '831 Publication") discloses a novel 3D mixed-reality space and experience construction sharing system is configured to provide a novel part-holographic and part-physical object-based immersive user experience environment that enables an intermixture of computer-generated lifelike holographic objects and real objects to be synchronized and correlated to a particular physical space (i.e. as a "mixed-reality" (MR) environment) for vividly-interactive user experiences during a users visit to the particular physical space. U.S. Publication No. 2017/0153787 ("the '787 Publication") discloses a method for injecting a 3D virtual museum artifact in augmented reality space for interaction therewith by a user of a mobile device. U.S. Publication No. 2017/0124763 ("the '763 Publication") discloses a museum augmented reality platform that interacts between computer devices and a server via a communication network. Lastly. U.S. Publication No. 2012/0278721 ("the '721 Publication") discloses a museum tour system to be used by a museum administrator and a museum guest. None of these address the problems noted in the prior art as contemplated and resolved by the instant invention disclosed herein.

If there existed a 3D virtual museum available to everyone online or on the Internet it would be well received. As there are no such 3D virtual museums known, there exists a need for such a system. It is, therefore, to the effective resolution of the aforementioned problems and shortcomings of the prior art that the present invention is directed. The instant invention addresses this unfulfilled need in the prior art by providing a balloon holding, concealing, release and drop bag device as contemplated by the instant invention disclosed.

SUMMARY OF THE INVENTION

In the present invention, these purposes, as well as others which will be apparent, are achieved generally by providing a virtual 3D museum device and system.

In accordance with one aspect, the present invention provides a to a history and cultural 3D virtual museum that creates a worldwide alternative public access to a public museum that has a user-friendly software based interactive platform that is accessible worldwide on-line via the Internet or comparable remote access network systems. The museum includes a variety of images including an outside image of the museum and walks the visitor from outdoors through the entrance into the museum. The museum includes a plurality of floors and sections which display a myriad of objects, pictures and artifacts along with audio and visual descriptions of the items much like an actual "in-person" museum. It also provides guided tours, monitors on every floor with search engines, touch tone screen and museum library. The Invention includes an interactive children's section, theatre room, bookstore, research section, library, bookstore and green space. The Invention includes processor readable steps of instructions in the form of object and source computer code for accessing and navigating the museum.

In another aspect, the present invention provides a history and cultural 3D virtual museum that creates a worldwide alternative public access to a public museum that includes and provides a user-friendly software based interactive platform that is accessible worldwide on-line via the Internet or comparable remote access network systems with a variety of images including an outside image of the museum and its outer structure and walks the visitor from outdoors through the entrance into the museum and then through the museum into the various sections and floors as dictated by the user through selective operation of the user-friendly software, creates alternative public access to African American history worldwide and is meant to be a user-friendly 3D Virtual Reality Museum experienced worldwide and provides an affordable vehicle to increase worldwide awareness to African American history in New Jersey and surrounding states.

In an additional aspect, the present invention provides a history and cultural 3D virtual museum that creates a worldwide alternative public access to a public museum that includes and provides a user-friendly software based interactive platform that is accessible worldwide on-line via the Internet or comparable remote access network systems with a variety of images that is designed to be adapted to other cultures and historical time periods.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

With reference to the drawings in which like reference designators refer to like elements, FIGS. 1 to 9 depict the preferred and alternative embodiments of the instant invention, which is generally referenced as a 3D virtual museum, 3D museum, museum and, or by numeric character 10. There is shown in FIGS. 1-4 a 3D virtual museum 10 having a plurality of floors 1-4, such as the four floors 1-4 shown in the drawings, each with a plurality of exhibits 18-23, 50-56, 73-77 and 89-95 on each floor, respectively, which is made and operated from user friendly interactive software operable on virtually any processor and accessible on-line via the Internet or other globally accessible computer network from anywhere in the world to provide the experience of visiting an actual museum in person. The museum 10 is directed to a history and cultural 3D virtual museum 10 that creates a worldwide alternative public access to a public museum. The museum 10 includes and provides a user-friendly software based interactive platform that is accessible worldwide on-line via the Internet or comparable remote access network systems. The museum 10 includes a variety of images including an outside image of the museum and its outer structure 12 and walks the visitor from outdoors through the entrance into the museum and then through the museum into the various sections and floors as dictated by the user through selective operation of the user-friendly software. The primary purpose of the instant invention 10 is to create alternative public access to African American history worldwide and is meant to be a user-friendly 3D Virtual Reality Museum experienced worldwide. The primary information for the proposed project is to offer an affordable vehicle to increase worldwide awareness to African American history in New Jersey and surrounding states. However, the instant invention 10 is designed to be adapted to other cultures and historical time periods.

The museum 10 includes a first floor with exhibits 18-23, a second floor with exhibits 50-56, a third floor with exhibits 73-77 and a fourth floor with exhibits 89-95 which display a myriad of objects, pictures, artifacts, and other items of interest along with audio and visual descriptions of the items much like an actual "in-person" museum. Although the instant invention 10 is illustrated to show four floors, it may be constructed and customized to include any number of floors and exhibits with any theme. The instant invention 10 may also provide guided tours and monitors on every floor 1-4 with search engines, touch-tone screens, and museum libraries. The museum 10 may also include an interactive children's section, theatre room, bookstore, research section, library, bookstore, and green space. The interactive software of the instant invention includes processor readable steps of instructions in the form of object and source computer code for accessing, visiting, and navigating the museum.

With reference to FIGS. 1-9, the 3D virtual museum 10 preferably includes an online accessible and operable African American 3D Museum, called the Sankofa African American 3D Museum™. The instant invention 10 focuses on collecting, preserving, and displaying in the exhibits 18-23, 50-56, 73-77 and 89-95 on each floor 1-4 African American artifacts, literature, films, music, and heroic achievements that change and help shape this great nation. The 3D virtual museum 10 of the instant invention includes priceless collections valued over 500 million placed online which focus on New Jersey, Pennsylvania, and New York from the 1600s to the 1800s consisting of the Slavery and the Underground Railroad, Historical Churches, Historical Cemeteries, interviews (historians in the tri-state area), military collection (World War II and Korean War male/females), culture and historical music albums of 45's, 33's, 68's and 78's LP's. Genres include pop (pre-1925), early electrical discs (1925-1935), pop from 20's, 30's, 40's through the 50's, 60's, 70's, Jazz, Big Band, Pop, Blues, Rhythm, Blues, Country, Standup Comedian, Latin Music, Opera, Pop (Popular Music), R&B, Soul, Reggae and audio tapes of historic talking heads. Although the 3D museum of the instant invention 10 preferably focuses on African American culture and history, the instant invention 10 may include other themes, such as American colonial, South American or Chinese history and culture, to name a view, that use and adapt the software of the instant invention for these themes. The museum 10 includes a reception desk, at least one theatre room that seats 200-300 people, bookstore, café with a menu and dining area and kitchen, four floors, The first floor presents blacks around the world theme with exhibit areas: Exhibit Area #1—The Africans 2,000,000—B.C.E.-15,000 B.C.E., Exhibit Area #2—Origins of African Presence in Europe, Exhibit Area #3—Portugal Leads The Slave Trade, Exhibit Area #3a—The British Dominate The Trade, Exhibit Area #4-1626-1750 The African Diaspora, Exhibit Area #4a—Caribbean Islands, Exhibit Area #5—Native American Indians—1,200 SF, Exhibit Area #6—Trans-Atlantic Slave Trade—1,200 SF, Accessory Space—Storage, Coat Room, Delivery, Elevators, Stairs, Trash Area, Outdoor Terrace, etc. The second floor presents New Jersey from the 1600's-1790 with Exhibit Area #1—Colonial Period—1,000 SF, Exhibit Area #2—Trans-Atlantic Slave Trade Exhibit Module 1620—1,600 SF, Exhibit Area #3—Slavery in New Jersey (1650-1700)—1,200 SF, Exhibit Area #4—New Jersey Revolutionary War (1776)—1,800 SF, Exhibit Area #5—Important People During Slavery 1700's—1,000 SF, and Exhibit Area #6—Slave House (1800's)—(STAND ALONG) 200 SF. The third floor presents slavery from 1790-1870 with Exhibit Area #1—African Americans (1790)—1,200 SF, Exhibit Area #2—Trans-Atlantic Slave Trade Exhibit Module (1818)—1,600 SF, Exhibit Area #3—New Jersey Underground Railroad—1.200 SF, Exhibit Area #4—Blacks During The Civil War—1,200 SF, Exhibit Area #5—Slavery in New Jersey (1800's-1900's)—1,600 SF, Exhibit Area #6 & #6a—Historic Black Churches in New Jersey, Pennsylvania and New York (1700's-1800's)—1,400 SF, Exhibit Area #7—Historic Black Cemeteries in New Jersey, Pennsylvania and New York (1700's-1800's)—1,400 SF, and Exhibit Area #8—Slavery in NJ Emancipation/Reconstruction (1870-1910)—1,800 SF. The fourth floor theme presents blacks during 1910-1980 in approximately 200 SF with Exhibit Area #1—African Americans in New Jersey (1920-1930s)—1,200 SF, Exhibit Area #2—African Americans in New Jersey (1940s)—800 SF, Exhibit Area #3—African Americans in New Jersey (1950s)-1,600 SF, Exhibit Area #4—African Americans in New Jersey (1960s)—1,800 SF, Exhibit Area #4, Exhibit Area #5—African Americans in New Jersey (1970s-1980)—1,800 SF, Exhibit Area #6—African American Music/Sports—2,400 SF (2 spaces), Exhibit Area #7—Historic African American Collectors—1,200 SF. Children's Room—1,200 SF, Executive Offices—2 to 4 offices, Computer Research Room—2,000 SF, and Media TV/Radio Room—800 SF. The roof top has green space, outdoor terrace, rooftop dining and museum bulletin board of events on television screens at the north and south ends.

Figure 1:
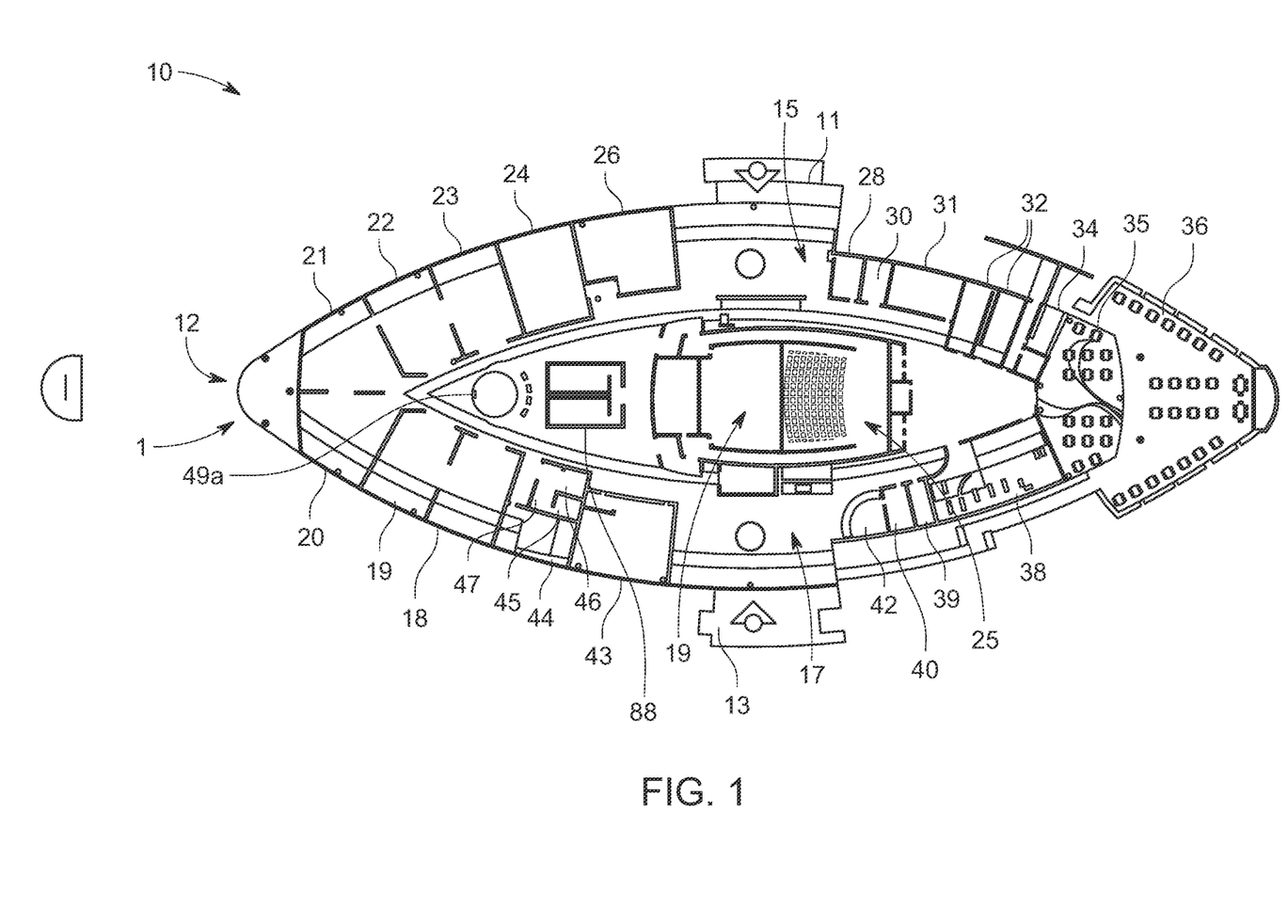
FIG. 1 is an elevational diagram view of the first floor of the 3D virtual museum in accordance with the principles of the present invention.

Now referring to FIG. 1, the first floor 1 of the museum 10 preferably includes exhibits 18-23, a west entrance 11 for access to a west lobby 15 and the museum 10, east entrance 13 for access to an east lobby 17 and the museum 10, general storage 19, Gen. St. & services 24, theatre 25 of approximately 3237 square feet with storage and elevators, mechanical room 26, Gen. St. 28, trash recycle room 30, west stairs 31, restrooms 32, kitchen 34, café 35, terrace 36, bookstore 38, coat room 39, office 40, reception 42, administration 43, east stairs 44, mechanical room 45, freight elevator 46, service lobby 47, A Rich Legacy exhibit 49a and restrooms 88. The first floor may also include a reception desk, theatre room that seats 200-300 people, book store, museum café, exhibit area #1, exhibit area #2 and accessory space. Exhibit 1 (18) displays artifacts and images of The Africans from 2,000,000 BCE to 15,000 BCE in an approximately 1265 square foot room. Exhibit 2 (19) displays artifacts and images of the Origins Of African Presence In Europe in an approximately 1244 square foot room. Exhibit 3 (20) displays Portugal Leads The Trade artifacts and images in an approximately 1356 square foot room. Exhibit 4 (21) displays the African Diaspora artifacts and images from 1625 to 1750 in an approximately 1356 square foot room. Exhibit 5 (22) displays Leni Lenape Indians artifacts and images in an approximately 1245 square foot room. Exhibit 6 (23) displays Trans-Atlantic Slave Trade artifacts and images in an approximately 1264 square foot room. The west stairs 31, east stairs 44 and central stairs 51 provide access to the second floor 2.

Figure 2:
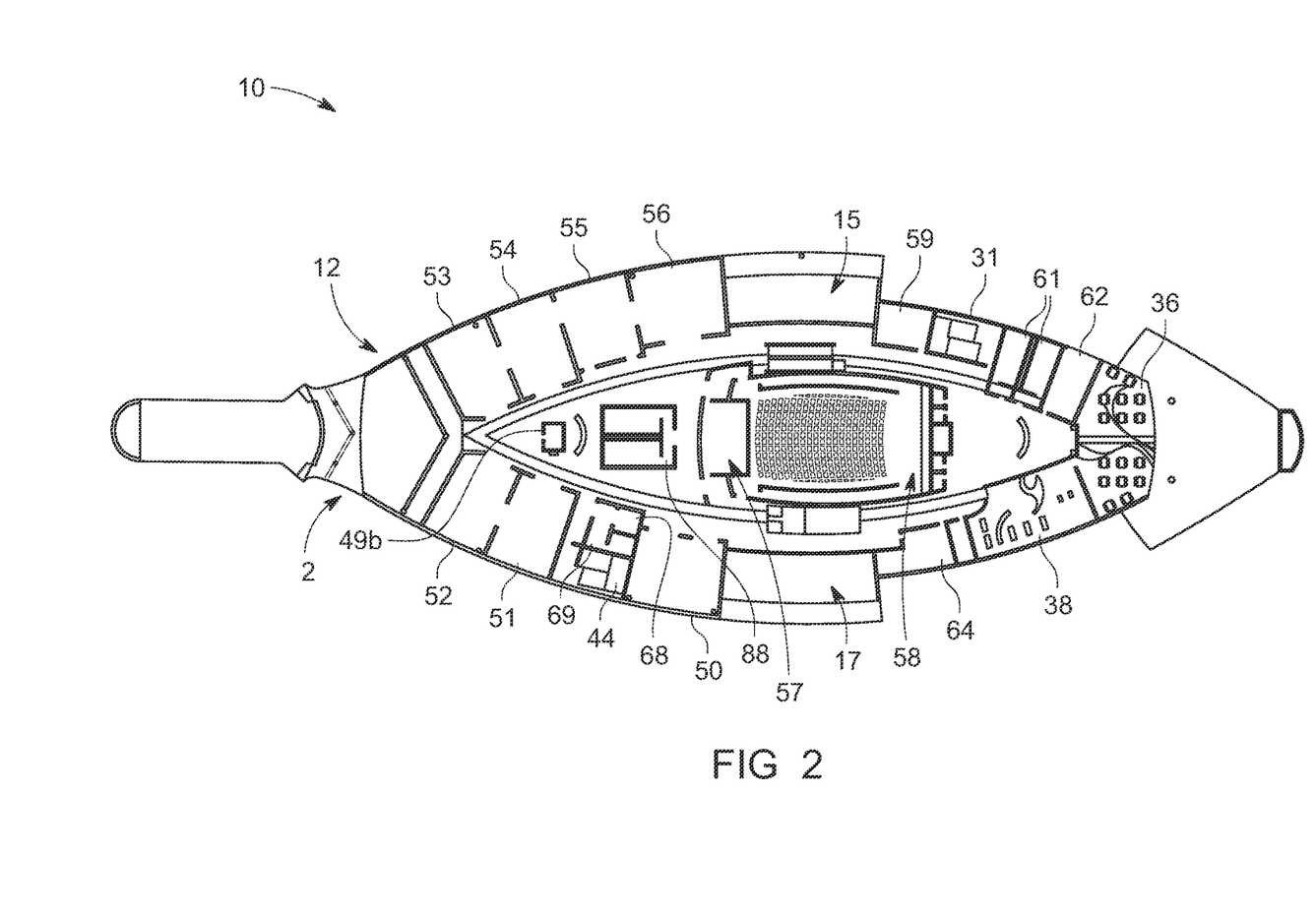
FIG. 2 is an elevational diagram view of the second floor of the 3D virtual museum in accordance with the principles of the present invention.

Now referring to FIG. 2, the second floor 2 of the museum 10 preferably includes second floor exhibits 50-56, upper openings to view the west lobby 15 and east lobby 17, IDF/Server/IT Systems room 59, west stairs 31, restrooms 88 and 61, 1800's Slave House 49b, projection room 57 of approximately 715 square feet, Joel Freeman theatre 58 of approximately 4941 square feet, storage room 62, upper opening to the terrace 36, upper opening to the bookstore 38, office suite 64 of approximately 588 square feet, east stairs 44, freight elevator 68 and St. and Serv. Lobby 69 of approximately 110 square feet and 200 square feet, respectively. Second Floor Exhibit 1 (50) displays artifacts and images of the Colonial Period in an approximately 1499 square foot room. Second Floor Exhibit 2 (51) displays artifacts and images of the Transatlantic Slave Trade Exhibit Module 1620 in an approximately 1265 square foot room. Second Floor Exhibit 3 (52) displays artifacts and images of Slavery In New Jersey from 1650 to 1700 in an approximately 1244 square foot room. Second Floor Exhibit 4 (53) displays artifacts and images of New Jersey During The Revolutionary War in 1776 in an approximately 1244 square foot room. Second Floor Exhibit 5 (54) displays artifacts and images of Important People During Slavery in the 1700's in an approximately 1266 square foot room. Second Floor Exhibit 6 (55) displays artifacts and images Women During Slavery in New Jersey in the 1700's in an approximately 1247 square foot room. Second Floor Exhibit 7 (56) displays artifacts and images of Women During Slavery in New Jersey in the 1800's in an approximately 1462 square foot room. The west stairs 31 and east stairs 44 provide access to the first floor 1 and third floor 3. The second floor may include Exhibit Area 1 for colonial period at approximately 1000 square feet, Exhibit Area 2 for Trans-Atlantic Slave Trade Exhibit Module at approximately 1600 square feet, Exhibit Area 3 for Slavery in New Jersey (1650-1700) at approximately 1200 square feet, Exhibit Area 4 for New Jersey Revolutionary Period (1600-1776) at approximately 1800 square feet, Exhibit Area 5 for Important People at approximately 1000 square feet and Exhibit Area 6 for Slave House at approximately 200 square feet.

Figure 3:
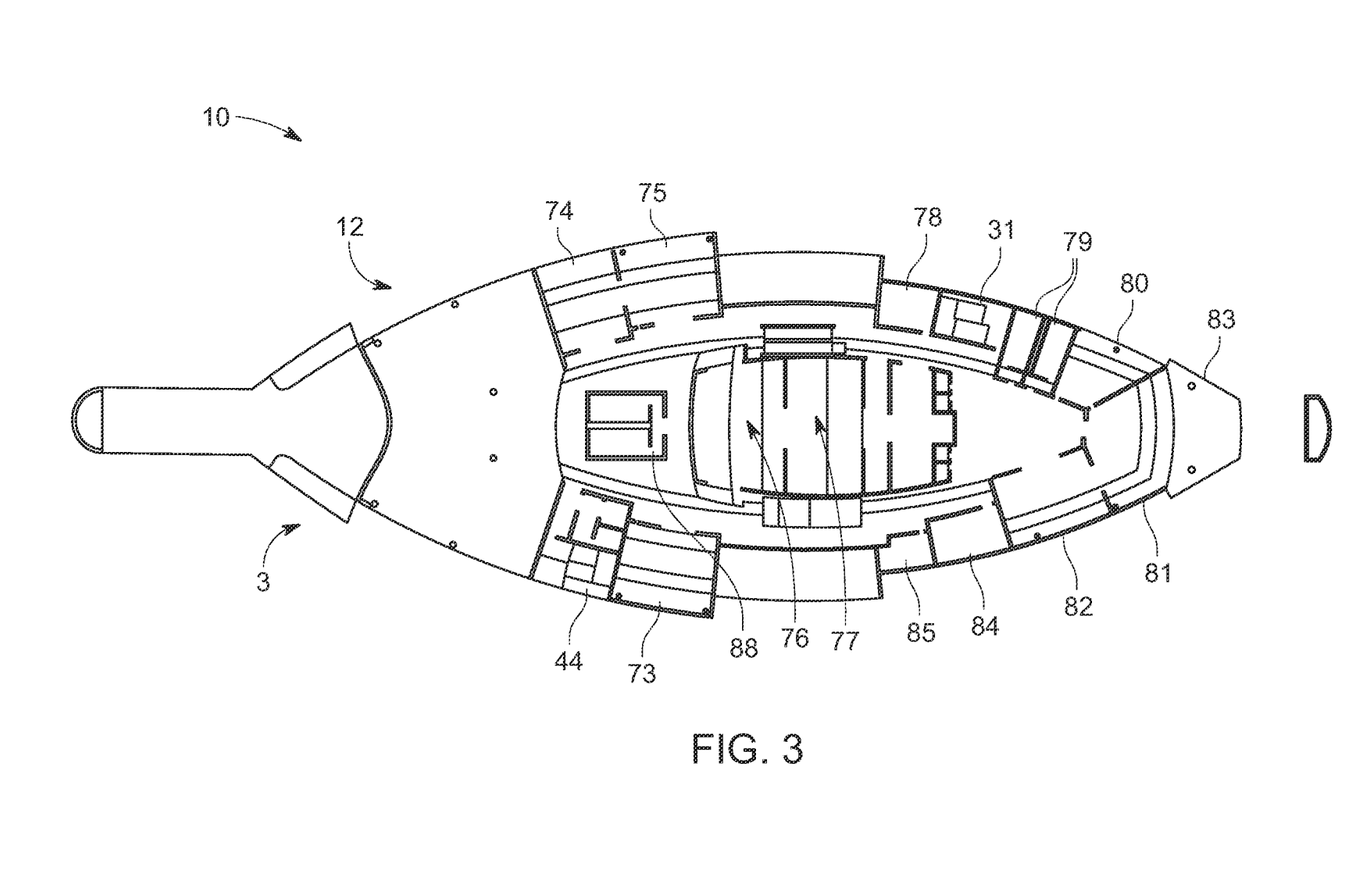
FIG. 3 is an elevational diagram view of the third floor of the 3D virtual museum in accordance with the principles of the present invention.

Now referring to FIG. 3, the third floor 3 of the museum 10 preferably includes third floor exhibits 73-77 and 80-82, research room 78, west stairs 31, restrooms 79, exterior terrace 83, curator room 84 of approximately 670 square feet, executive office 85 of approximately 354 square feet, east stairs 44 and restrooms 88. Third Floor Exhibit 1 (73) displays artifacts and images of African Americans in 1790 in an approximately 1477 square foot room. Third Floor Exhibit 2 (74) displays artifacts and images of the Transatlantic Slave Trade Exhibit Module in 1818 in an approximately 1270 square foot room. Third Floor Exhibit 3 (75) displays artifacts and images of the New Jersey Underground Railroad in an approximately 1482 square foot room. Third Floor Exhibit 4 (76) displays artifacts and images of New Jersey African American Troops During Civil War in an approximately 2161 square foot room. Third Floor Exhibit 5 (77) displays artifacts and images of Slavery In New Jersey from the 1800's to the 1900's in an approximately 2070 square foot room. Third Floor Exhibit 8 (80)

displays artifacts and images of Slavery In New Jersey Emancipation/Reconstruction from 1870-1910 in an approximately 911 square foot room. Third Floor Exhibit 7 (81) displays artifacts and images of Historic Black Cemeteries In New Jersey, Pennsylvania, and New York from the 1700's to the 1800's in an approximately 1663 square foot room. Third Floor Exhibits 6 and 6a (82) displays artifacts and images of Historic Black Churches In New Jersey and Pennsylvania in an approximately 1410 square foot room. The west stairs 31 and east stairs 44 provide access to the second floor 2 and fourth floor 4. The third floor may include the slavery period during 1790-1870 and have Exhibit Area #1—African Americans (1790) at approximately 1,200 square feet, Exhibit Area #2 for Trans-Atlantic Slave Trade Module (1818) at approximately 1,600 square feet, Exhibit Area #3 for Slavery in New York and Pennsylvania (1870-1910) at approximately 1,600 square feet. Exhibit Area #4—Slavery in NJ Emancipation/Reconstruction (1870-1910) at approximately 1,800 square feet, Exhibit Area #5—Underground Railroad Exhibits at approximately 1,200 square feet and Exhibit Area #6—Slave House (1800s) at approximately 200 square feet.

Figure 4:
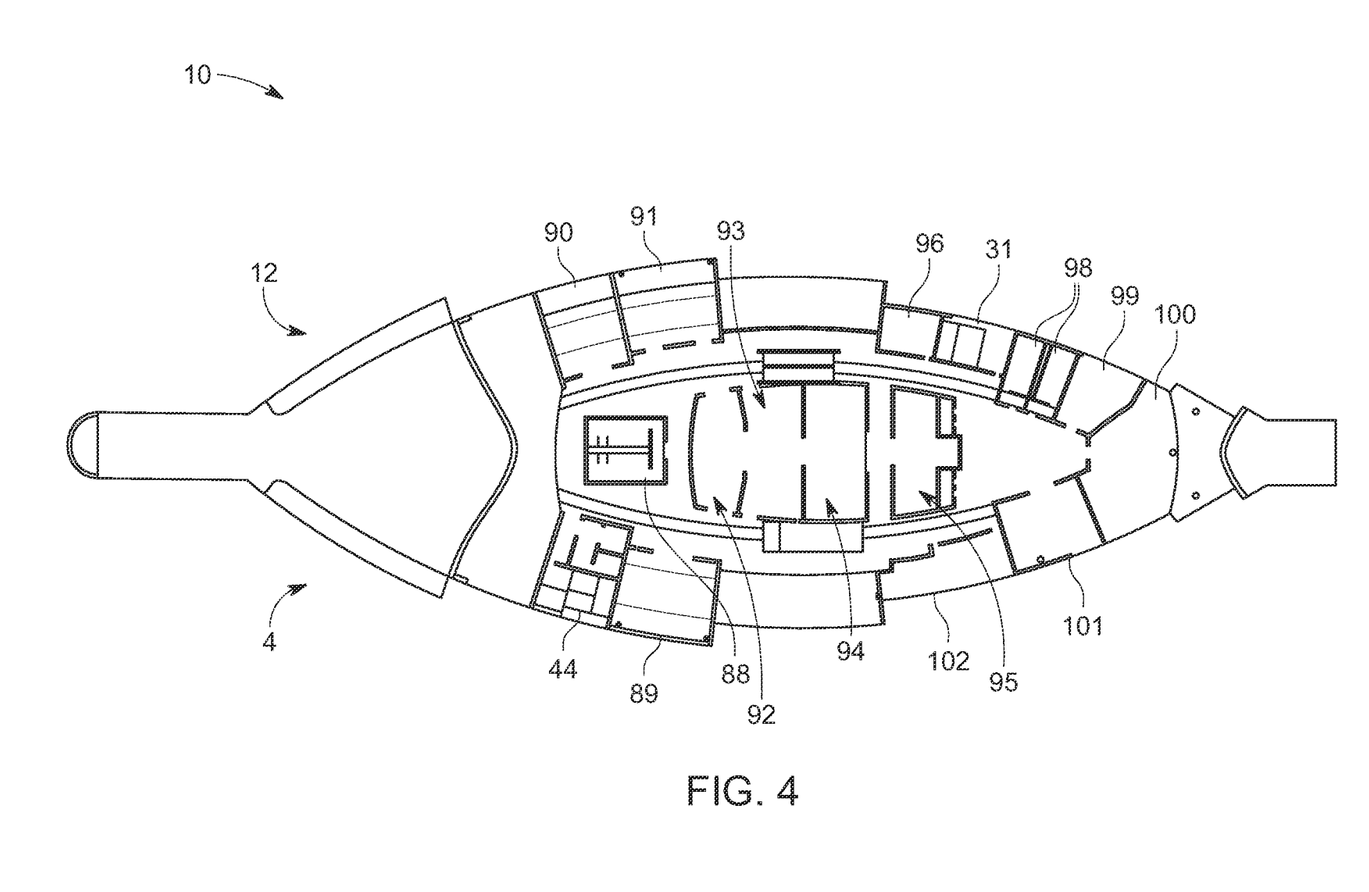
FIG. 4 is an elevational diagram view of the fourth floor of the 3D virtual museum in accordance with the principles of the present invention.
Figure 5:
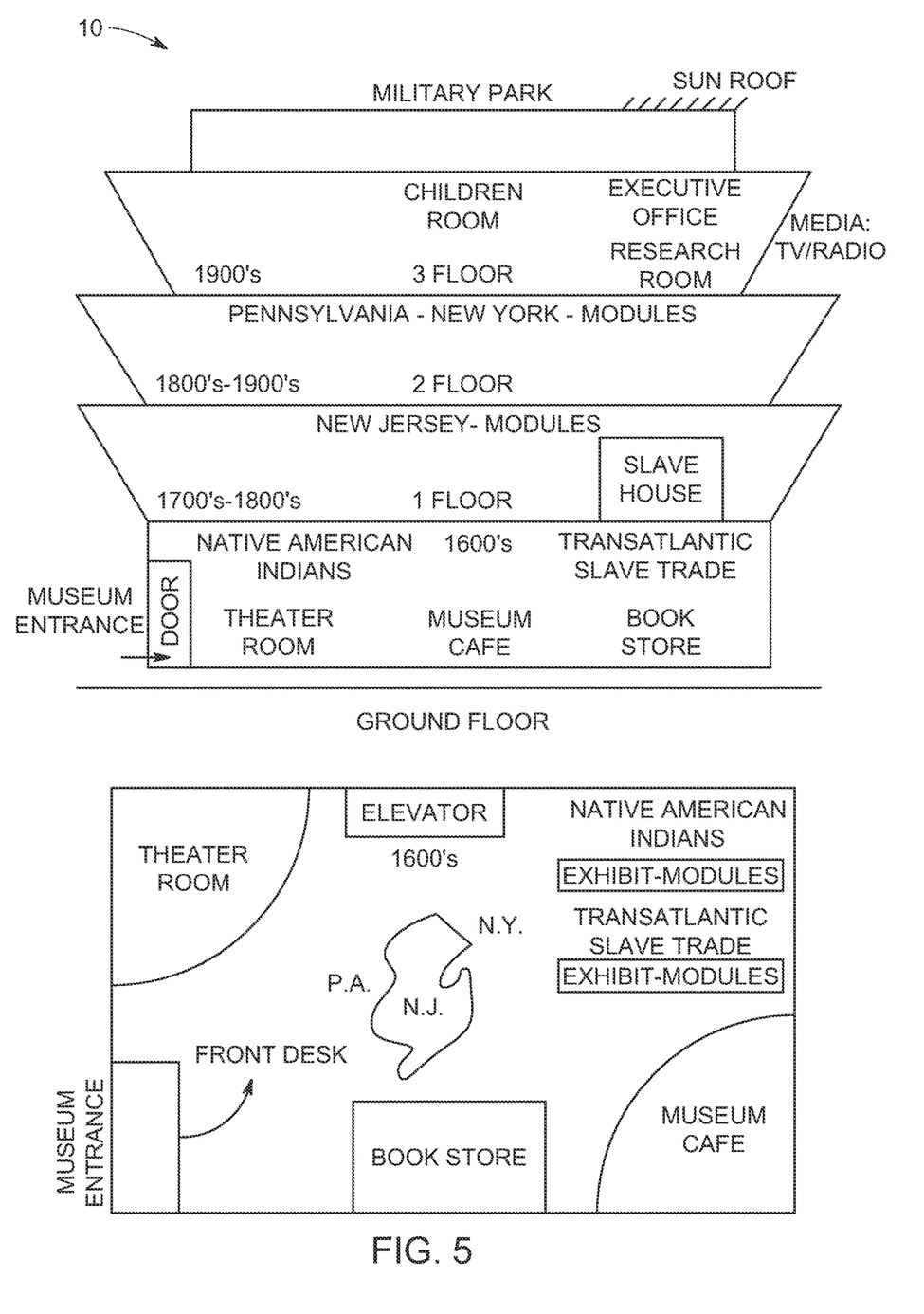
FIG. 5 is diagram view of the military park and ground floor of the 3D virtual museum in accordance with the principles of the present invention.
Figure 6:
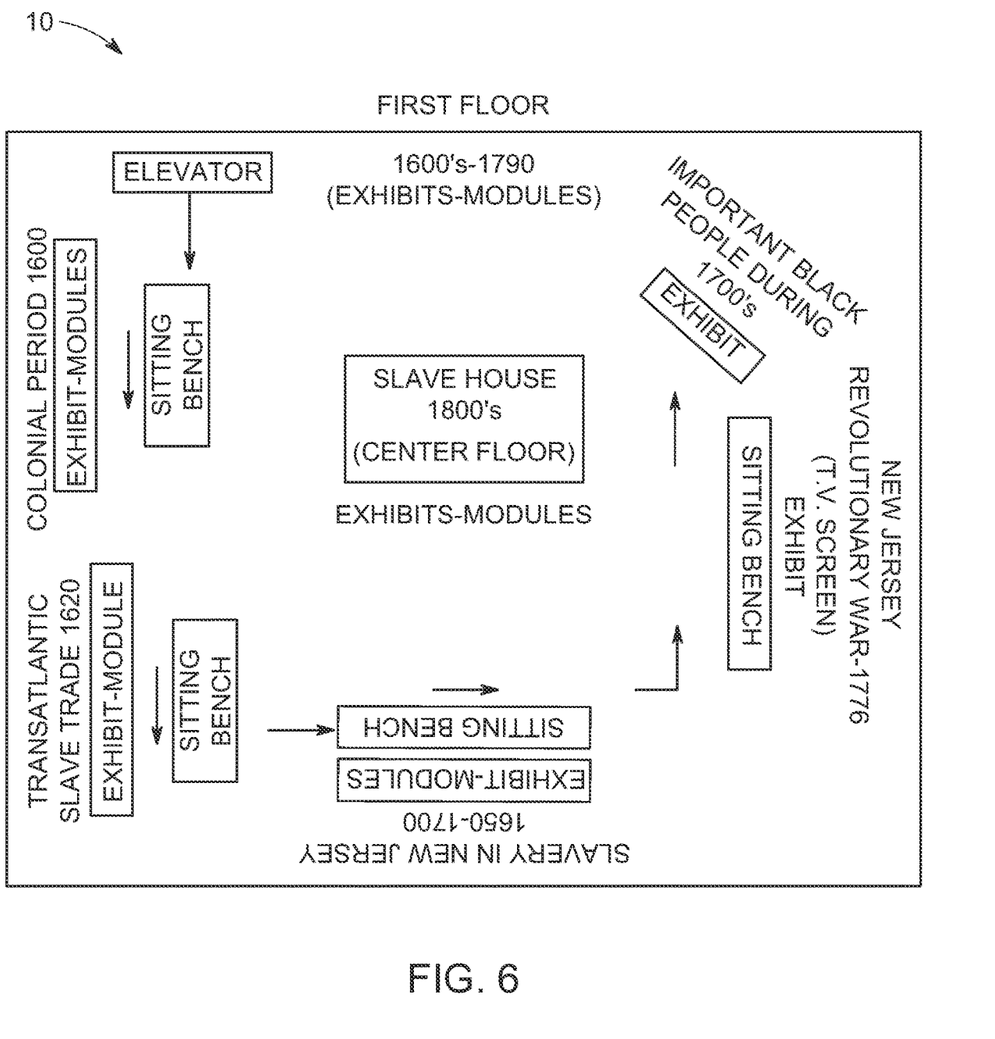
FIG. 6 is an elevational diagram view of the first floor of the 3D virtual museum in accordance with the principles of the present invention.
Figure 7:
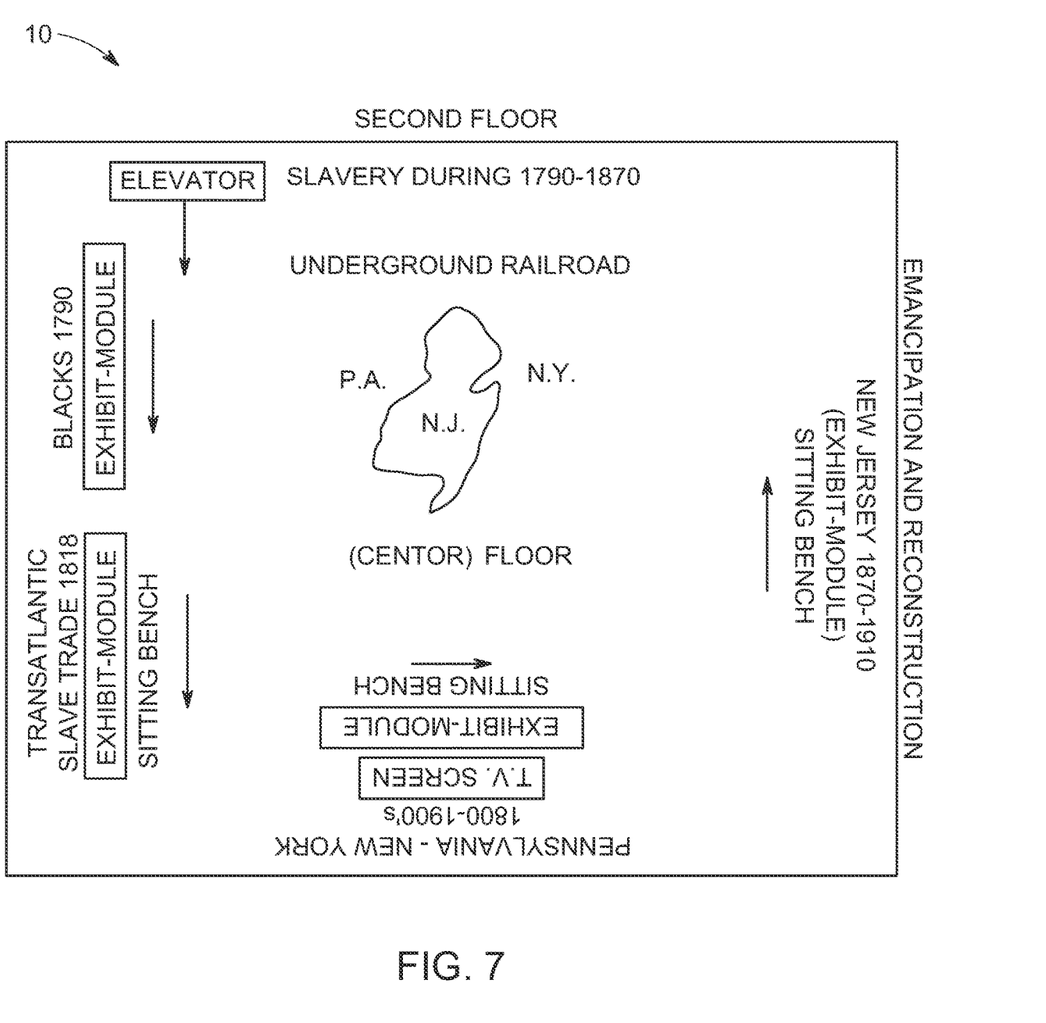
FIG. 7 is an elevational diagram view of the second floor for slavery from 1790 to 1870 of the 3D virtual museum in accordance with the principles of the present invention.
Figure 8:
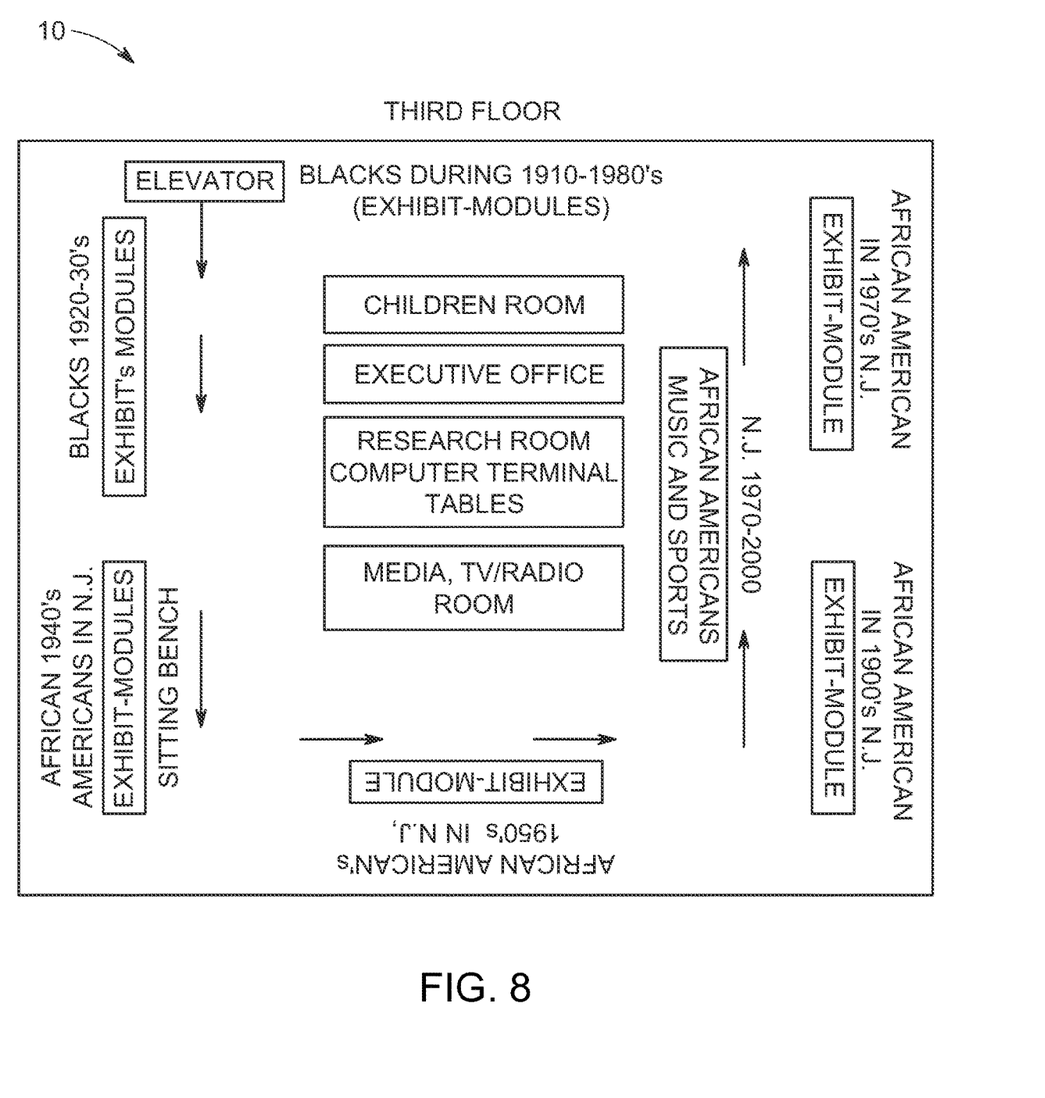
FIG. 8 is an elevational diagram view of New Jersey 1910-1980's of the 3D virtual museum in accordance with the principles of the present invention.
Figure 9:
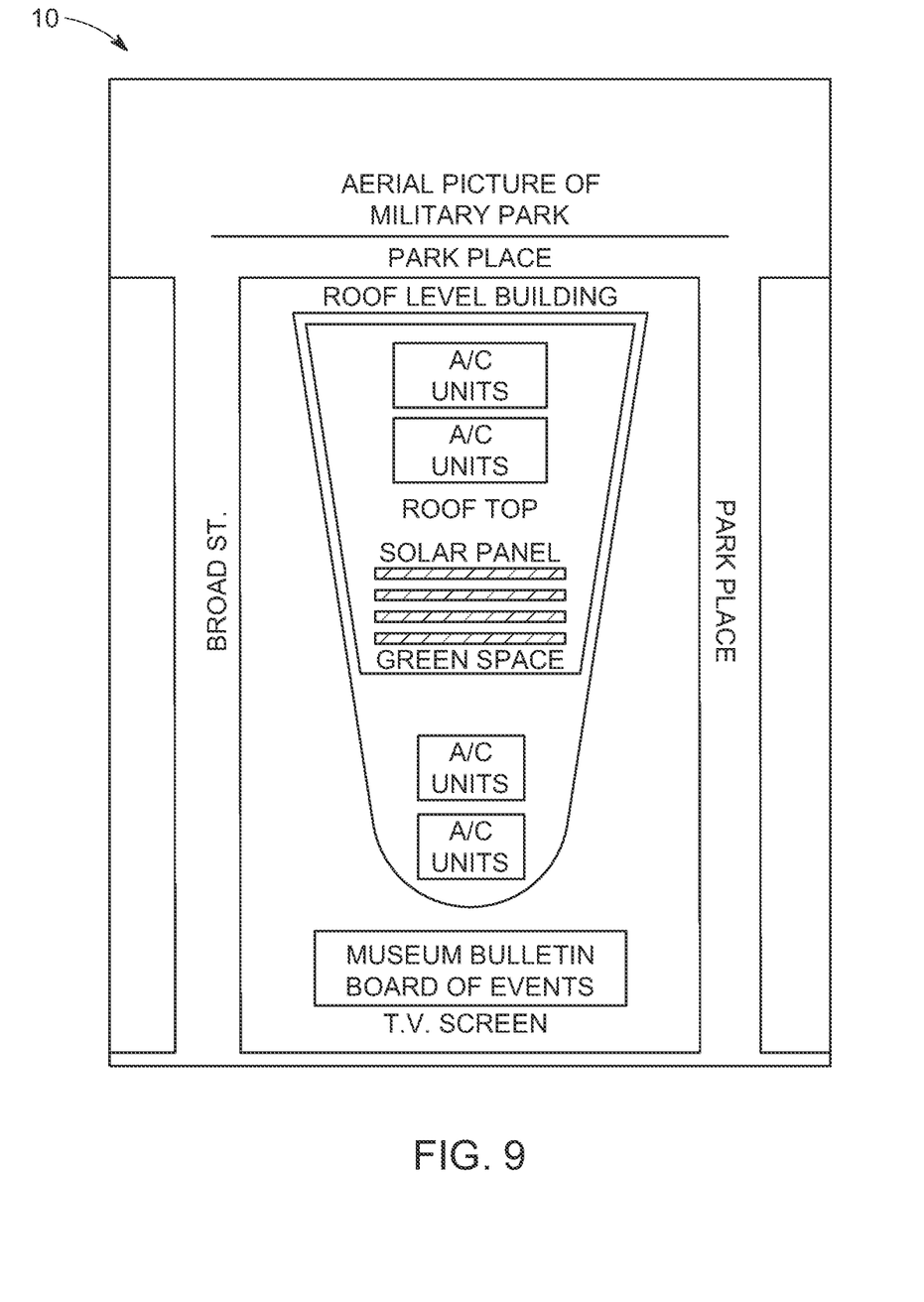
FIG. 9 is an elevational diagram view of the military park of the 3D virtual museum in accordance with the principles of the present invention.

Now referring to FIG. 4, the fourth floor 4 of the museum 10 preferably includes fourth floor exhibits 89-95, storage room 96, west stairs 31, restrooms 98, Media TV/Radio Room 99 of approximately 796 square feet, Computer Research Room 100 of approximately 1983 square feet, Kids Corner room 101 of approximately 1219 square feet, Executive Offices 102 of approximately 1040 square feet and restrooms 88. Fourth Floor Exhibit 1 (89) displays artifacts and images of African Americans in New Jersey from 1920 to 1930 in an approximately 1477 square foot room. Fourth Floor Exhibit 2 (90) displays artifacts and images of the African Americans in New Jersey in the 1940's in an approximately 1270 square foot room. Fourth Floor Exhibit 3 (91) displays artifacts and images of African Americans in New Jersey in the 1950's in an approximately 1482 square foot room. Fourth Floor Exhibit 4 (92) displays artifacts and images of African Americans in New Jersey in the 1960's in an approximately 1099 square foot room. Fourth Floor Exhibit 5 (93) displays artifacts and images of African Americans in New Jersey from the 1970's to the 1980's in an approximately 1454 square foot room. Fourth Floor Exhibit 6 (94) displays artifacts and images of African Americans in Music/Sports in an approximately 1619 square foot room. Fourth Floor Exhibit 7 (95) displays artifacts and images of African American Collections in an approximately 1130 square foot room. Third Floor Exhibits 6 and 6a (82) displays artifacts and images of Historic Black Churches In New Jersey and Pennsylvania in an approximately 1410 square foot room. The west stairs 31 and east stairs 44 provide access to the third floor 3. The fourth floor (Blacks during 1910-1980) may include Exhibit Area #1 for African Americans in New Jersey (1920-1930's) at approximately 1,200 square feet, Exhibit Area #2 for African Americans in New Jersey (1940's) at approximately 800 square feet, Exhibit Area #3 for African Americans in New Jersey (1950's) at approximately 1,600 square feet. Exhibit Area #4 for African Americans in NJ (1960's) at approximately 1,800 square feet, Exhibit Area #5 for African American Music/Sports at approximately 2,400 square feet, Exhibit Area #6—Slave House (1970's) at approximately 1,200 square feet, Children's room at approximately 1,200 square feet, 2-4 Executive Offices, Computer Research Room at approximately 2,000 square feet and Media TV/Radio Room at approximately 800 square feet. The instant invention 10 may also include a roof top with green space, outdoor terrace and rooftop dining.

It will be appreciated by people skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system comprising:
a processor for processing a computer processor readable set of instructions;
the computer processor readable set of instructions readable by said processor, said set of instructions including instructions for simulating a virtual 3D museum and to provide a user-friendly software based interactive platform that is accessible worldwide on-line via the Internet or comparable remote access network systems;
said processor executable instructions including object and source computer code for a user accessing and navigating said virtual 3D museum in a virtual, immersive, and in-person like experience;
the virtual 3D museum comprising:
a variety of images including an outside image of the museum and walks the visitor from outdoors through the entrance into the museum: a plurality of virtual floors and sections which display a myriad of objects, pictures and artifacts along with audio and visual descriptions of the items;
an overall-theme and content relating to African-American culture and history;
one virtual floor comprising at least:
a plurality of virtual exhibits from the 1600's based at least on: Native American Indians and transatlantic slave trade, and includes a virtual theater room;
a different virtual floor comprising at least:
virtual models and exhibits based on New Jersey Modules from the 1700-1800s including a virtual slave house;
a different virtual floor comprising at least:
a virtual interactive children's section and a plurality of virtual exhibits with themes from the 1900's;
a virtual roof on the virtual 3D museum including at least both a virtual military park and a green space;
wherein the virtual exhibits in the virtual 3D museum provide information relating to preserving historical or cultural information, and provide information relating to an educating the user using a fully-immersive 3D virtual reality environment; and
the virtual 3D museum further comprises:
historically accurate reconstructions, multi-media archives, and, on every floor, providing at least both guided tours and monitors with search engines.

2. The system of claim 1, wherein the virtual museum further comprises: a touch tone screen and a virtual museum library.

3. The system of claim 1, wherein the virtual museum further comprises: a virtual bookstore.

4. The system of claim 1, wherein the virtual museum further comprises: a virtual research section.

5. The system of claim 1, wherein the virtual museum further comprises: a virtual library.

6. The system of claim 1, wherein the virtual museum further comprises: a virtual bookstore.

7. The system of claim 1, wherein the virtual roof of the virtual museum further comprises: a screen displaying a bulletin board of museum events.

\* \* \* \* \*